Jan. 12, 1960 R. WERTHEIMER 2,920,417
DETERGENT-SOLUTION DISPENSING CONTAINER
Filed Jan. 22, 1958
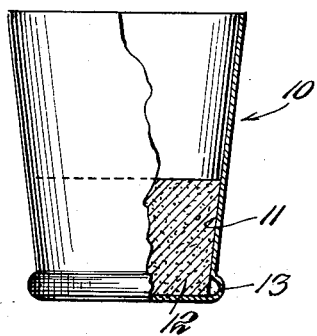
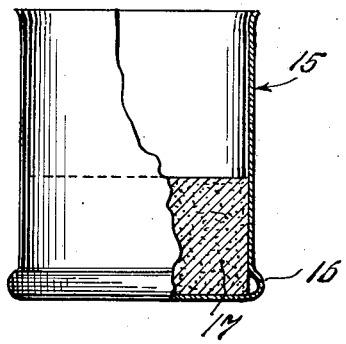
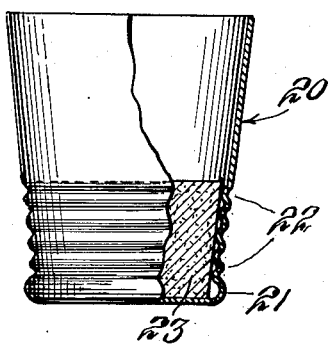
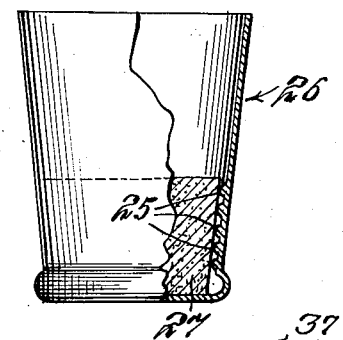
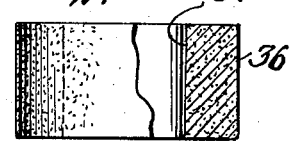
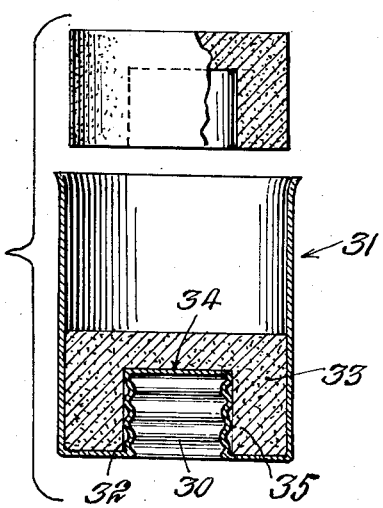
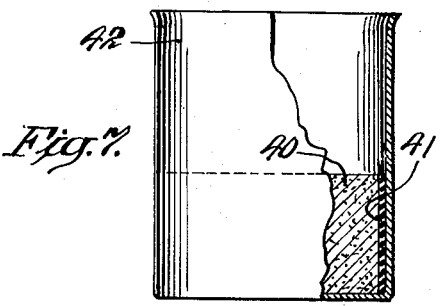
INVENTOR
ROBERT WERTHEIMER
BY
ATTORNEY

United States Patent Office 2,920,417
Patented Jan. 12, 1960

2,920,417

DETERGENT-SOLUTION DISPENSING CONTAINER

Robert Wertheimer, New York, N.Y., assignor to Sylvia T. Wertheimer, New York, N.Y.

Application January 22, 1958, Serial No. 710,544

2 Claims. (Cl. 45—28)

The invention relates to a container for dispensing a detergent or other cleansing agent which initially is in the form of a cake adapted to be retained securely by the said container.

It has for an object to provide a ready means whereby the cleansing agent may be suitably dissolved and dispensed as required. To this end said agent is caused to remain in the form of a cake which becomes a fixed part of the container until substantially consumed, whereby further handling of the detergent is not required.

A further object of the invention is to provide a container construction adapted for cooperation with the cake of detergent material, said cake being designed to be introduced initially into the container under pressure, or similarly replaced, to have a forced fit therewith in order that it shall remain therein until substantially consumed.

Another object of the invention is to so construct the container that it will check the flow of solvent (water) along the inner surface of the container wall contacted by the cake and thus confine its dissolving action to the upper exposed surface portion of the cake for substantially uniform consumption of the detergent.

Still another object of the invention is to utilize the inherent resiliency afforded by the container wall construction, or by intermediate elements, to retain adequately the cake of detergent material to the container, as well as to check the possible flow of solvent past its top exposed surface.

The invention has for an object, also, to provide a novel combination of container and detergent cake which will admit of utilizing the container in dispensing a solution of the detergent simply by manually supporting the container beneath a source of water supply such as a conventional faucet; and which, also, will prevent waste of the detergent, as well as over-saturation of the solution.

In carrying out the invention, a water-tight container is provided such as a cup-shaped receptacle of suitable water-tight material which may be resilient, or be constructed to impart resiliency, to insure that the cake will be held under adequate pressure so as to prevent its separation from the container. Thus, in manipulating the novel combination in supplying water to the cake and in delivering detergent solution therefrom, said cake remains firmly located within the container until substantially wholly consumed.

The nature of the invention, however, will best be understood when described in connection with the accompanying drawings, in which:

Fig. 1 is a front elevation, partly in vertical section, illustrating a container with cake of detergent material retained in the lower portion thereof.

Fig. 2 is a similar view of a cylindrical type of container with retained cake of detergent.

Fig. 3 is a vertical section of a conical type of container and illustrates a modification in the manner of sealing the cake therein.

Fig. 4 is a view similar to Fig. 3 and illustrates a further modification.

Fig. 5 is a vertical section illustrating a modification in both the container construction and the cake of detergent material to be retained thereby, the latter being shown partly in section.

Fig. 6 is an elevational view, partly in vertical section, and illustrates a modification in the cake suitable for use with the type of container illustrated in Fig. 5.

Fig. 7 is a front elevation, partly in vertical section, of a modified form of the novel container-cake combination.

Referring to the drawings, more particularly to Fig. 1 thereof, 10 designates a generally frusto-conical shaped container or cup of water-tight and more or less elastic material such as polyethylene, the wall 11 of this material, and particularly the bottom portion thereof, being more or less resilient or compressible to accommodate and adequately retain a tablet or cake 12 of a suitable cleansing material, for example, a compressed detergent powder. Such cake is shaped to conform generally to the bottom portion to secure its retention in the container under the inherent elasticity of the wall-constituting material. In fitting such a cake within a container, the said wall portion in becoming substantially integrated with the cake, may compress or distort slightly the wall portion thereat, but this will not be to any objectional degree.

To enhance the locking action, it is preferred to provide the container at the extreme bottom with a degree of flexibility thereat to prevent dislodgement of the cake, for example, by providing a convolution 13 in the wall portion. The relative tight fit secured by the aforesaid combination, furthermore, prevents water, designed to be received in the upper portion of the container for solution of the detergent, from seeping downwardly and so tending to free the cake to cause its dislodgement and separation from the container during the operation of pouring the solution therefrom.

Instead of the frusto-conical form of container hereinbefore described, the same may assume a cylindrical shape, as is the case of the container 15, Fig. 2 of the drawings. A bottom, outwardly directed convolution 16 is provided which similarly enhances the holding action for the cake 17. In this embodiment, the latter is cylindrically shaped to conform to the shape of the containing vessel.

In connection with the aforesaid frusto-conically shaped container, it may in some instances be desirable to continue convolutions upwardly from the bottom one shown in Fig. 1 of the drawings. Thus, reference being had to Fig. 3 of the drawings, the container 20 not only is provided with the outwardly directed convolution 21 at the extreme bottom to assure flexibility as aforesaid, but with the convolutions 22, parallel to the convolution 21, which contact the periphery of the cake 23 to serve as gaskets for excluding water from the cake portion below the immediately top contact surface of said cake.

Instead of convolutions being provided by the container, a circumferential beading such as a series of parallel ridges 25, Fig. 4 of the drawings, may be formed over the inner surface of the wall of the container 26, the same being designed to make pressure contact with the periphery of the cake 27.

A still further embodiment is disclosed in Fig. 5 of the drawings, wherein the holding convolutions 30 of the container 31, herein shown as of cylindrical conformation, are provided by a portion of the bottom 32 which is directed inwardly. The cake 33 is then formed with a corresponding bottom recess 34, and is designed in inverted position to be forced over the said inturned bottom portion 32 to engage for sealing contact its annular section 35 between the said inturned portion and the outer wall of the container, as is shown.

Or the cake 36, reference being had to Fig. 6 of the drawings, may be of tubular construction in which case its inner wall 37 then is adapted to fit over the inturned portion 32 of the bottom of the container, Fig. 5.

Resiliency may be provided, also, by mounting over a cake 40 of detergent, Fig. 7 of the drawings, an elastic collar 41 to embrace tightly said cake which is preferably cylindrically shaped. When the said cake is then forced into a cylindrical container 42 it will, through its interposed collar 41 then become securely anchored therein and seepage of water is prevented.

I claim:

1. A detergent-solution dispensing, open-top container of the imperforate, resilient material type, the vertical wall of said container at its lower portion being provided with at least one internal, transverse, annular convolution portion to impart additional resiliency thereto, and a block of rigid, solidified detergent material having a forced fit within said lower portion of the container and extending upwardly beyond the convolution portion to seal off the interior of said container below the top of the block, the latter being retained solely under pressure exerted by the resiliency of container material augmented by said convolution portion sealing off solvent for the rigid block of detergent material, said solvent being confined thereby to the space above the top.

2. The dispensing container according to claim 1, wherein circular ridges are provided in the material wall above the convolution and are directed inwardly parallel thereto.

References Cited in the file of this patent

UNITED STATES PATENTS

| | | |
|---|---|---|
| 229,067 | Williams | June 22, 1880 |
| 453,538 | Berninghaus | June 2, 1891 |
| 880,207 | Foster | Feb. 25, 1908 |
| 1,123,211 | Scott | Dec. 29, 1914 |
| 2,352,769 | Brown | July 4, 1944 |
| 2,810,146 | Jarvis | Oct. 22, 1957 |